United States Patent [19]

Kadono et al.

[11] Patent Number: 5,076,349

[45] Date of Patent: Dec. 31, 1991

[54] APPARATUS FOR GAS/LIQUID SEPARATION

[75] Inventors: Tetsuro Kadono, Hirakata; Joji Okamoto, Kobe, both of Japan

[73] Assignee: Shionogi & Co., Ltd., Osaka, Japan

[21] Appl. No.: 572,541

[22] Filed: Aug. 27, 1990

[30] Foreign Application Priority Data

Aug. 29, 1989 [JP] Japan .............................. 1-101284[U]

[51] Int. Cl.$^5$ ................................................ F28B 1/02
[52] U.S. Cl. ...................................... 165/111; 165/110; 165/104.19; 62/435; 62/434; 62/3.7; 62/3.6
[58] Field of Search .................... 165/110, 111, 104.19; 62/435, 434

[56] References Cited

U.S. PATENT DOCUMENTS 2,685,177  8/1954  Wagner .................................. 62/435

FOREIGN PATENT DOCUMENTS 62-156302  10/1987  Japan .
62-156303  10/1987  Japan .
1-120902   8/1989   Japan .

OTHER PUBLICATIONS

Tetsuro Kadono and Joji Okamoto, Development of a High-Performance Evaporating Apparatus for Organic and Biological Samples in Test Tubes, Reprint fr. Annual Report of Shionogi Research Lab., No. 38, 35-49 (1988).

Primary Examiner—Albert W. Davis, Jr.
Attorney, Agent, or Firm—Cushman, Darby & Cushman

[57] ABSTRACT

An apparatus for gas/liquid separation has a heat-exchanging condensor housed in an adiabaic coolant container, in combination with an adiabatic reservoir for the condensed liquid. The condensor has an inner pipe conduit for a passive coolant which circulates through the conduit, and the container and is cooled by a freezer coil of an outside refrigerator and effectively cools the solvent vapor travelling through a clearance formed between the inner side wall of said condensor and outer side wall of said inner pipe conduit. This feature enables a continuous operation without troublesome replenishing of an active component in a freezing mixture as an active coolant. The adiabatic reservoir receives the condensed liquid and has a visual gauge for monitoring. A communicating plug detachably provided on the shoulder of the adiabatic reservoir serves to supply an auxiliary freeze-protecting solvent into the reservoir, for easy treatment of a solvent which is liable to be solidified by excessive cooling.

9 Claims, 9 Drawing Sheets

APPARATUS FOR GAS/LIQUID SEPARATION

BACKGROUNDS OF THE INVENTION

1. Field of the Invention

The present invention generally relates to the art of gas/liquid separation for recovering sample and/or solvent in solution. Particularly, it is concerned with a gas/liquid separator constructed by combining a heat-exchanging condensor of high cooling and condensing efficiency with an adiabatic resorvoir for the condensed liquid of an excellent trapping efficiency. Said separator also has a sufficient safety and convenience for permitting an operator an easy handling in, for instance, a chemical laboratory without poluting its environment by maintaining possible re-evaporation minimum.

2. Description of the Prior Art

Hitherto, vapor of solvent generated from a rotary flask or test-tube evaporating/condensing apparatus has, in general, been being cooled by employing a coolant-circulating coiled condensor. Gas phase which cannot be liquified from the vapor during its travel through the condensor has however been sucked by an aspirator and simply expelled from the laboratory through, for example, a draft chamber.

The cooling tube of the known coolant-circulating coiled condensor has however an insufficient cooling efficiency. Should a related apparatus or apparata of some complementary nature be employed, its solvent distilling efficiency cannot be made sufficiently high. Thus, a hazard of intoxication for operators or a polution of the environment cannot be avoided in handling a solution which contains a low boiling-point solvent or a noxious/inflammable solvent.

In particular, in the case of treating a sample labeled with radio-isotope, an aspirator of sink-discharge type cannot be used and thus, the use of one of circulating type in a closed system is considered to be compulsory. In general, if the cooling tube does not have a sufficient solvent liquefying/recovering efficency, any of the low boiling point solvents is inevitably mixed with the water running through the aspirator to suck the vapor, inviting a conspicuous decrease in the degree of vacuum (vacuum level) to be attained. In a closed system in particular, the low boiling-point solvent is being accumulated little by little in the circulating water during the operation. Even if only scanty amount of the solvent is being dissolved in the water at a time, the evacuating ability of aspirator is remarkably lowered in the end. In order to effectively overcome the mentioned drawbacks and to improve the vapor cooling and condensing ability of the cooling tube, there has heretofore been proposed various gas/liquid separating apparata, some of which are combined with any means for efficiently trapping the condensed solvent.

One of these proposal has been disclosed in Japanese Laid-Open Utility Model Application (Jikkaisyo) 62-156,302 by the present inventors and illustrated here in FIG. 6 of the attached drawings. The disclosure relates to a gas/liquid separator characterized in a combination of a heat-exchanging condensor 210 of double tube type wherein a lower end of an inner tube 212, a descending path for mixture of vapor with condensed liquid introduced from a vapor inlet 216 at its top, is extended downward and terminated at a vicinity of a lower part of an outer tube 214. The heat-exchanging condensor 210 communicates with said outer tube 214 which has an outlet 218 for evacuation at its top and an outlet tube 220 for the condensed liquid at its lower end, a means for cooling said condensor from outside by, for instance, with a freezing mixture held in a container 224, and an adiabatic reservoir 222 for the condensed liquid having an opening 226 capable of detachably fitting with the outlet tube 220 of said condensor by, for instance, a ball-joint 228. Said reservoir 222 also has, at its shoulder, an outlet 232 for the liquid, connected with a guide tube 230 and a cock 234.

A great improvement in the solvent trapping efficiency has been made by embodying this proposal, though, the temperature of the solvent recovered from the embodied apparatus cannot be made sufficiently low. Thus, an escape of raw vapor from the apparatus cannot be avoided and an efficient separation of solidifying solvent such as water, benzene, glacial acetic acid and the like is still difficult.

Another proposal disclosed in Jikkaihei 1-120,902 (Laid-open print of Japanese Utility Model Application, Jitsugansho 63-17,715) by the present inventors has been made also on a gas/liquid separator of a combination of a heat-exchanging condensor 10' with an adiabatic reservoir 50' for the condensed liquid, illustrated here in FIGS. 7 and 8, respectively. In the disclosed apparatus, the heat-exchanging condensor 10' is composed of a container 30 of coolant formed integrally with while centering about a vertical pipe structure 12. The vertical pipe structure 12 has a top opening 16 for communicating with an evacuating means or a vapor generating means through a connector 20 provided with a ball-joint 18 and a bottom opening 22. The vertical pipe structure 12 permits inflow of vapor and outflow of condensed liquid. In the vertical structure 12 between the top opening 16 and the bottom opening 22, ascending or descending flow of the vapor and descending flow of the condensed liquid pass through. The apparatus further has an inner pipe conduit 34 which is substantially concentric with and runs in substantially parallel with said vertical pipe structure 12 between an upper outlet 36 and a lower inlet 38, through which the space inside said inner pipe conduit 34 is communicating with a space 32 formed between the inner side wall of said container 30 and the outer side wall of said vertical pipe structure 12 for circulating the coolant. Said adiabatic reservoir 50' has, at its top 52, an opening (a ball-joint 54) for detachably fitting with said bottom opening 22 of said vertical pipe structure 12. Said adiabatic reservoir 50' is formed integrally with a head part 56, being just beneath said top part 52, a shoulder 64 and a body 66 in said order. Said head part 56 accommodates a dew-drop type centering device 58 of a pointed lower end 59, having vents 60 for escaping vapor. Said shoulder 64 is provided with a first opening 68 with a ball-joint 74 and a second, communicating, opening 70 with a guide tube 78' which reaches the inner bottom of the reservoir 50'.

Any one of these disclosed apparata is presupposing the use of a freezing mixture, such as dry ice/acetone, as its active coolant. The use of the freezing mixture capable of producing an extremely large temperature gradient with respect to the dew point of the solvent vapor to be treated is intended so that the mixture could act on the solvent vapor through the wall, which separates the most effectively the spaces inside and outside the vertical pipe structure, which is accommodated in said container.

The operation of these apparata is however troublesome in a sense, because the charged dry ice is being consumed with the progress of the heat-exchange and must be replenished constantly if one wishes to maintain the temperature of the freezing mixture to that is intended.

In the apparatus disclosed in Jikkaisyo 62-156,303 by the present inventor and illustrated in FIG. 9 here, a heat-absorbing rod means (freezing rod) 518 is connected to a split type refrigerator 530, through a coolant path 516 covered with an heat-insulator coating 520. The rod is concentrically accommodated in a core tube of a heat-exchanging condensor 510, in order to obviate the mentioned trouble. An intact pass-through of the raw vapor cannot, however, be avoided because only central portion of the travelling vapor flow actually contacts with the freezing rod to be cooled. An adiabatic reservoir 522 similar to that aforementioned is also employed. In order to improve the cooling ability of the freezer rod, fins may be provided a round the rod. The cooling efficiency might even be lowered however, by any material stuck to the fins, and species of the solvent vapor which can be treated might sometimes be limited because of the attendant problems of possible corrosion and polution of the fins.

What is needed is a gas/liquid separation system which can be inexpensively manufactured and yet performs the separation efficiently. Sufficiently rugged construction and simple operation for running the system are also essential for the apparatus which permits heavy and abusive use by any person who is not an expert in a laboratories.

Other objects of the present invention and the attendant advantages thereof will be made apparent to those skilled in the art by reading the following detailed description.

SUMMARY OF THE INVENTION

According to the present invention, there is provided an apparatus for gas/liquid separation comprising a heat-exchanging condensor housed in an adiabatic container for coolant with its lower end piercing through the bottom of said container, in combination with an adiabatic reservoir for the condensed liquid having a head part and a shoulder formed integrally with its body, wherein;

a) said heat-exchanging condensor includes a vertical pipe structure compartmentalize by a cylindrical partition into an inner pipe conduit and an outer pipe conduit which is substantially concentrical with said inner pipe conduit, and a cooling means for the coolant contained in an annular cylindrical space defined by the inner side wall of said container and the outer side wall of said vertical pipe structure, b) said outer pipe conduit permits flow of the vapor to be condensed throughout its whole length between its top opening and bottom opening, c) said inner pipe conduit occupies a major portion of said vertical pipe structure in cross section, and communicates with said annular cylindrical space at its upper outlet and lower inlet which pierce through said outer pipe conduit to permit convection circulation of the coolant between said inner pipe conduit and said annular cylindrical space, d) said adiabatic reservoir has a top opening capable of detachably connecting with the bottom opening of said vertical pipe structure, a visual gauge extended across its entire height for monitoring the liquid drop and liquid amount, and, on said shoulder, at least two openings, one of which receives a communicating plug which is connected, inside the reservoir, with a flexible tube capable of reaching the inner bottom of the reservoir, and e) said head part of said adiabatic reservoir accommodates a means for centering the condensed liquid to drip down.

In said heat-exchanging condensor, said vertical pipe structure may preferably be, and ordinarily is, formed integrally with said adiabatic coolant container but may alternatively be formed separately being ready to be combined together for use in actual operation.

In actual operation, said outer pipe conduit permits the passage of the ascending or descending flow of the vapor and the descending flow of the condensed liquid therethrough between its top and bottom openings.

Said top opening is capable of connecting with an evacuating means or a vapor generating means whereas said bottom opening permits the inflow of the vapor and the outflow of the condensed liquid.

Said coolant is not an active coolant of a freezing mixture such as dry ice/acetone and the like but a passive coolant which must be cooled by said cooling means. Said cooling means may preferably be accommodated in said annular cylindrical space at a position where it effectively act on at least upper portion of the contained coolant.

Said cooling means may preferably be a heat-absorbing head (freezing head) of a split type refrigerator in general, but may alternatively be a means for receiving a secondary coolant from a separate refrigerator and returning it to the refrigerator to produce a steady circulation of the coolant between said annular cylindrical space and said inner pipe conduit.

In either case, the passive coolant can be regarded as the secondary coolant if viewed from the refrigerator, and hence the intended heat-exchanging may function not directly but indirectly. The use of the secondary coolant, however, has an effect similar to that can be expected by a kind of buffer, that is, a thermal dam of substantial heat capacity, intervened therebetween and serves to suppress a possible temperature fluctuation during the condensing operation even if the refrigerating capacity of the refrigerator is insufficient for the purpose. An employment of a gas-tight structure for the adiabatic coolant container and a means capable of circulating and gasifying a primary coolant supplied from the refrigerator in an adiabatic expansion of the liquid coolant may be regarded to be more direct though, the resultant cooling is too much localized and the gasified primary coolant does not circulate smoothly, to expect a stable and steady heat-exchanging.

Another example of said cooling means may be a laminated Peltier effect element (thermo-element) and, in this case, a cooling end of the element may preferably be inserted into said annular cylindrical space to be immersed in the coolant.

If one wish to expect a rapid rise-up of the operation while employing a refrigerator of small capacity or Peltier effect element, a freezing mixture such as dry ice/acetone may be used as the secondary coolant at the initial stage of the operation. In this case, acetone which remains after the exhaustion of dry ice may serve as a simple passive coolant in the heat dam.

The adiabatic condensed liquid reservoir used in this invention has been developed from that of Dewar bottle type disclosed in the aforementioned Jikkaihei 1-120,902 by the present inventors. In the disclosed adiabatic condensed liquid reservoir, however, the guide tube 78' which reaches the inner bottom of the reservoir is made of a rigid material such as glass and fixed on the shoulder. Thus, in the case wherein the condensed liquid happened to freeze to be solidified at the tip of the guide tube, it might be difficult to remove the material from the resorvoir in particular, to make, a continuous operation for a long time period impossible.

In the present invention, the guide tube is, however, made of freeze resistant flexible synthetic resin, for instance, polytetrafluoroethylene reaching the inner bottom and is connected to a communicating plug fixed detachably on the shoulder. Thus, its exchange is very easy to make the apparatus available for treating a solvent liable to be solidified, for a long time without intermission.

Moreover, the adiabatic condensed liquid reservoir accommodates, at its head part extending from the top to the shoulder of the resorvoir, a centering means for the condensed liquid incoming from the top opening. The centering means is, as a whole, one of a funnel type which has, at its side wall, vents for escaping vapor and is formed, at its lower end, after a model suited for centering and dripping down the liquified vapor.

In addition, the reservoir of the present invention is provided with a window across the entire height thereof for monitoring the liquid drop and the liquid amount. The window may be exemplified as a transparent slit formed by removing a part of the plated silver layer of the Dewar bottle, through which anything happened inside the reservoir can be observed. And, by monitoring and counting the liquid drop through the window, adjustment and automatic control of the degree of vacuum and the like can be performed. The amount of the condensed liquid is also monitored.

The present invention is arranged to intend to effectively cool the portion of the coolant which is actually staying in said annular cylindrical space surrounding the core pipe, in particular, of the whole coolant contained in the adiabatic coolant container. By arranging as aforementioned, convective circulation of the newly cooled coolant generates between the annular cylindrical space and the inner pipe conduit piercing through the vertical pipe structure without the need of replenishing an active cooling component in a freezing mixture. And thus, an effective cooling on the vapor traveling through the outer pipe conduit is performed.

If the solvent to be distilled is a low boiling solvent such as diethylether, petoroleum ether and the like, the vapor is first introduced into the top part of the heat-exchanging condensor and liquefied while it is descending therethrough to drop or drip down into the adiabatic reservoir. The descending flow is generated by connecting the condensed liquid reservoir, at its shoulder, to an aspirator through a connector and a pipeline, to maintain the internal pressure inside both the heat-exchanging condensor and the condensed liquid resorvoir negative.

On the other hand, if the solvent to be distilled is one liable to solidify by cooling, such as water, glacial acetic acid, benzene and the like, the vapor is introduced into the heat-exchanging condensor through the shoulder of the adiabatic condensed liquid reservoir and liquefied while it is ascending therethrough to drop or drip down as a counter-flow into the adibatic condensed resorvoir. The ascending flow is generated by connecting the heat-exchanging condensor, at its top, to the aspirator, to maintain the internal pressure inside both the heat-exchanging condensor and the condensed liquid reservoir negative.

In the case of distilling the solidifiable solvents, an auxiliary solvent such as ethanol or n-hexane may previously be placed in the liquid reservoir to mix its vapor with the solvent liquefying during the travel, in order to prevent the possible solidification. In this case, the guide tube extending into the adiabatic condensed liquid reservoir for the primary purpose of recovering the solvent is flexible and is conveniently switched for introducing such auxiliary solvent.

The apparatus built in accordance with the present invention is not only capable of liquefying and trapping the solvent vapor generated from a rotary evaporator, a thin-film evaporator or a test-tube evaporator at an extremely high heat-exchanging efficiency, but also capable of implementing as an apparatus which can separate and recover a low boiling point solvent, as well as a hazardous or inflammable solvent, in high degree of safety and without polution of environment. In addition to this, the apparatus offers an operator a convenience of sufficiently long time continuous operation, by eliminating troublesome need of replenishing the apparatus with such a component as dry ice of a freezing mixture, an active coolant, etc. This is realized by utilization of only passive coolant combined with a suitable cooling means.

Furthermore, the monitoring window provided on the adiabatic reservoir for the condensed liquid serves to permit the operator to observe the progress of the treatment as well as the amount of the condensed liquid and the state of dropping solvent, and to set optimum degree of vacuum by adjusting, the needle valve N. In this way, the apparatus allows the operator to have his command on the states of solvent evaporation, to perform a treatment at an optimum degree of vacuum while effectively suppressing the bumping of sample solution due to an excessive degree of vacuum.

Moreover, by combining the adiabatic reservoir for the condensed liquid with a device for supplying an auxiliary, a freeze protecting solvent (the communicating plug 76 and the guide tube 78 are converted for this particular purpose). And by providing, on the shoulder of the reservoir, the opening capable of switching its connection from the suction path to the solvent vapor inflowing path, the apparatus enables the operator to treat a vapor of such a solvent of highly solidifiable nature as water, glacial acetic acid, benzene, piridine and the like, which is liable to invite a blockade of flow paths by an excessive cooling. This operation includes only (a) a switching of the descending flow to the ascending flow to adjust cooling ability of the heat-exchanging condensor at its respective regions and (b) an introduction of only small amount of a suitable auxiliary solvent to the reservoir for the condensed liquid at a suitable time to mix its vapor with the distilling solvent to prevent the possible solidification of the latter.

BRIEF DESCRIPTION OF DRAWINGS

In the following paragraphs, the present invention will be described in more detail by way of example illustrated in the attached drawings, in which.

DESCRIPTION OF THE PREFERRED EMBODIMENTS

Figure 1:
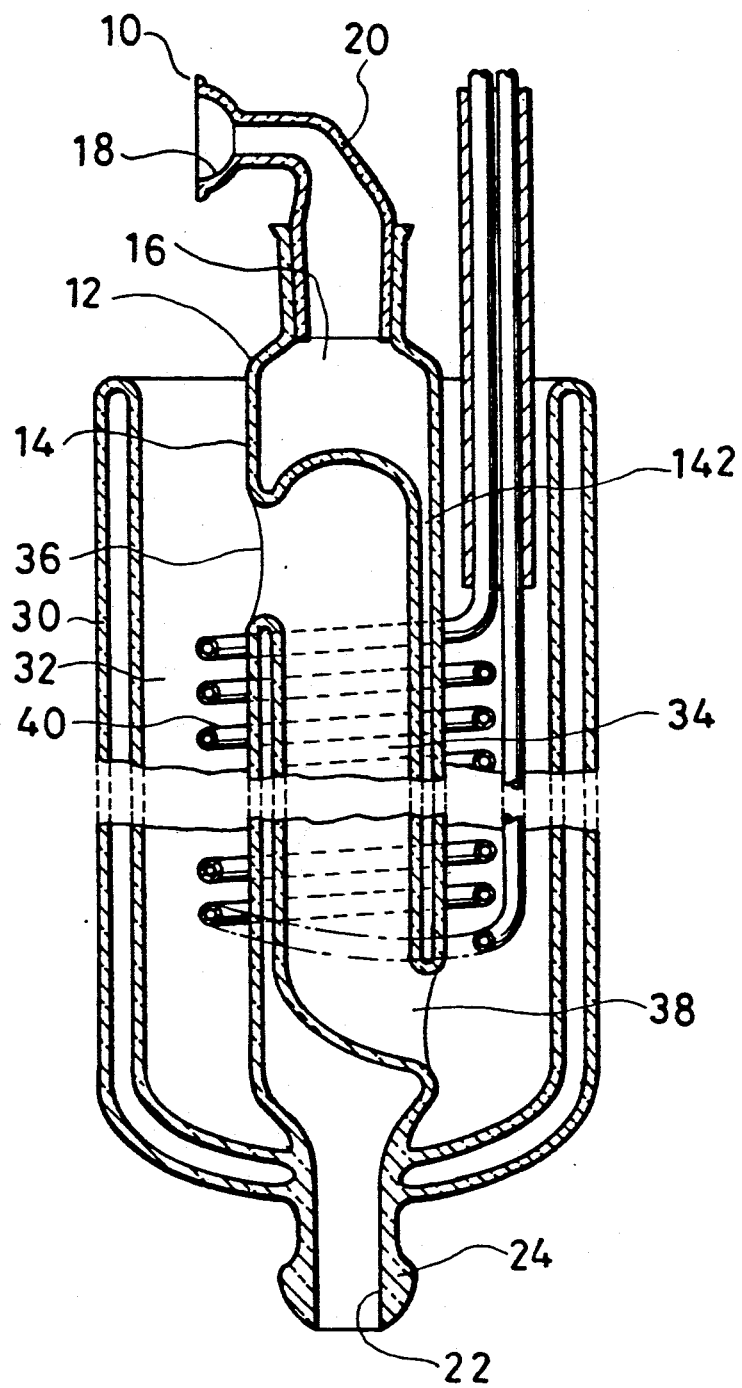
FIG. 1 is a schematic cross-sectional view of an embodiment of the heat-exchanging condensor, a component, of an apparatus for gas/liquid separation of the present invention.

In FIG. 1, a heat-exchanging condensor 10, one of the essential components of the present invention, comprises by combining: an adiabatic coolant container 30 of internally silver-plated double glass pipe, that is, of a Dewar bottle type; and vertical pipe structure 12 which is supported by, being concentrical with, said container 30. The lower part of said vertical pipe structure is piercing through the bottom of said container 30, and an annular cylindrical space 32 in said container 30 is surrounding said vertical pipe structure 12.

Said vertical pipe structure 12, whose interior plays the part of an outer pipe conduit 14 in itself, is provided with a top opening 16 which carries a connector 20 having a ball-joint 18 and with a bottom opening 22 which also has a lap-finished structure connectable with other components to be able to make easy and flexible positioning with respect to these components, that is, a ball-joint 24. For the convenience of illustration, the mid part of the long size heat-exchanging condensor 10 is cut out and omitted from the drawing. It is needless say that it is an elongated and continuous one.

Inside said vertical pipe structure 12, there is provided an inner pipe conduit 34, which is concentric and substantially parallel with said outer pipe conduit 14. The space inside said inner pipe conduit 34 communicates with said annular cylindrical space 32 at an upper outlet 36 and a lower inlet 38. Furthermore, the top part of said inner pipe conduit 34 has a round shape which can make a fluid flow which ascends through the interior and arrives said top part turn down to expel it from the upper outlet 36 while energizing the flow downwards.

On the other hand, a portion of the coolant placed in said annular cylindrical space 32 of the whole coolant filled in said container 30 is constantly cooled by a freezer coil 40 inserted in said annular cylindrical space 32 as a heat-absorbing head. The freezer coil 40 is connected to a main part of a split type refrigerator which is omitted from the illustration and is for producing a temperature difference between the portion of the coolant around the freezer coil 40 and the portion staying in said inner pipe conduit 34. This makes an unintermittent ascending flow of the coolant through said inner pipe conduit 34 by convection. If acetone of a freezing mixture such as dry ice/acetone is used as the coolant, violently ascending flow of the mixture may make boiling when it is leaving through the upper outlet 36 to said annular cylindrical space 32. The stated round shape in the vicinity of said upper outlet 36 can effectively serve to prevent a possible overflowing of the boiling coolant from the container 30. Thus, such shape in the vicinity of the upper outlet 36 is indispensable only for the case of using a freezing mixture.

The clearance 142 between the inner wall of said vertical pipe structure 12 and the outer wall of said inner pipe conduit 34 may preferably be made as small as possible and be under approximately 2 mm in an apparatus of handy and convenient dimension, for instance, of that having the vertical pipe structure 12 of 50 mm diameter, in in order to attain an excellent heat-exchanging efficiency.

During the travel through a flowing path formed in said narrow clearance 142 to produce a temperature gradient, the solvent vapor is being cooled effectively and consecutively, and any liquefiable solvent component is trapped almost completely. As a result, very small amount of the raw solvent is expelled through an aspirator or the like in a gaseous phase. This fact also means no inclusion of any hazardous or intoxicating matters in the components to be expelled, in addition to a high degree of vacuum maintained in the whole system and an improved efficiency of the aspirator; thus, the components can be expelled at a high safety level.

Figure 2:
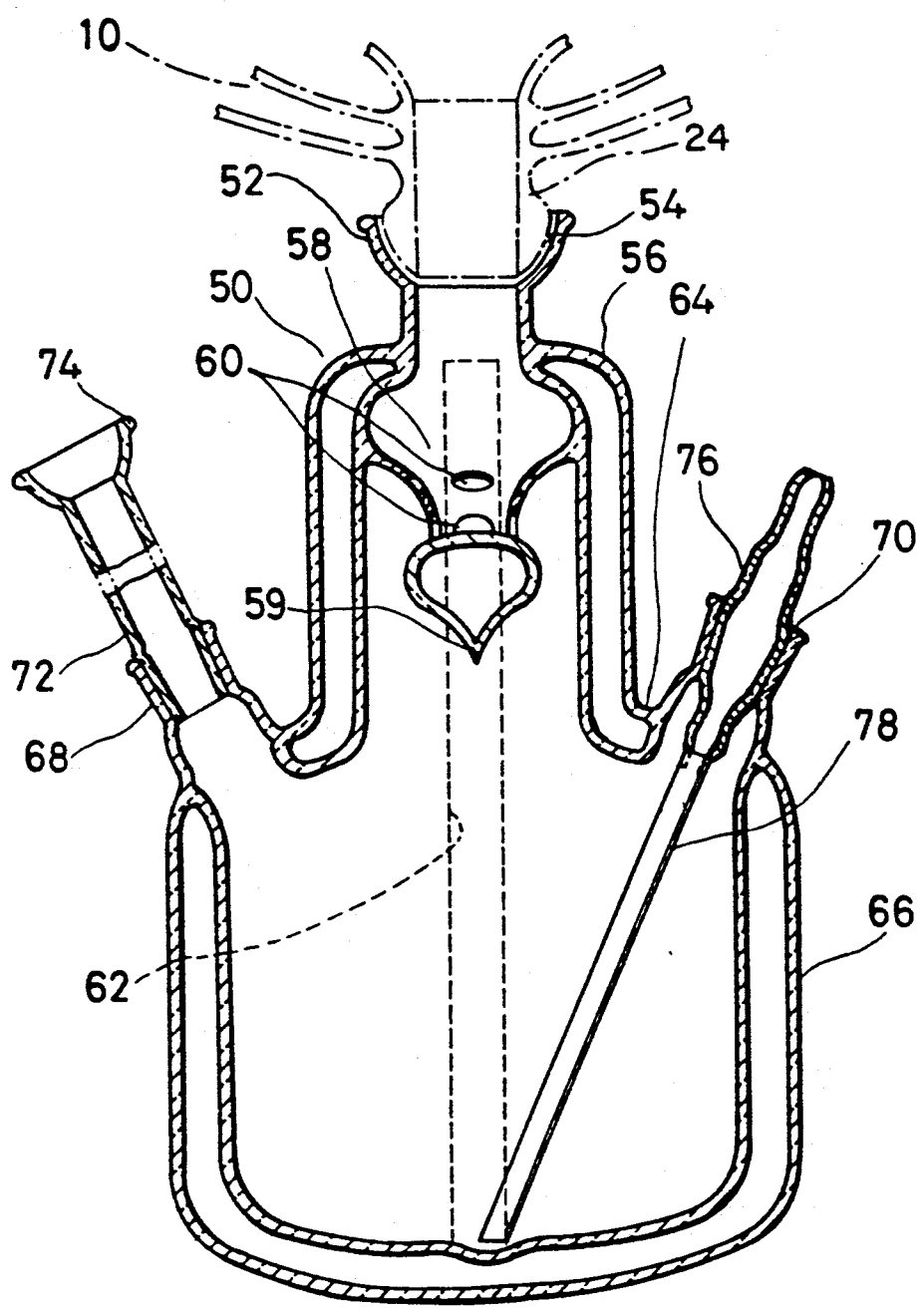
FIG. 2 is a schematic cross-sectional view of an embodiment of the adiabatic reservoir for condensed liquid, another component, which composes said apparatus together with said heat-exchanging condensor.

Said heat-exchanging condensor 10 of the stated embodiment may most effectively be used by combining it with the adiabatic reservoir 50 for the condensed liquid, shown in FIG. 2. Said adiabatic reservoir 50 for the condensed liquid also takes a double wall structure of Dewar bottle type and its top part 52 is provided with a ball-joint 54 which can connect with the bottom opening 22 of the condensor 10. Said adiabatic reservoir 50 for the condensed liquid is formed integrally with a head part 56, being just beneath said top part 52, a shoulder 64 and a body 66 in the said order. Said head part 56 accommodates a dew-drop type centering device 58 having vents 60 for escaping vapor, and said shoulder is provided with two lap-finished openings 68 and 70. A first lap-finished openings 68 detachably receives a connector 72 having a ball-joint 74, and a second lap finished opening 70 detachably receives a communicating plug 76 having a flexible guide tube 78 made of a plastics, and inserted into the adiabatic reservoir close to the inside bottom of the adiabatic reservoir 50. The guide tube 78 may preferably be made of polytetrafluoroethylene of cold-resistant property.

Said dew-drop type centering device 58 is formed integrally connected with the wall of said adiabatic reservoir 50 for the condensed liquid. And a plurality of vents 60 for escaping vapor are provided on a connecting part between the wall of the adiabatic reservoir 50 and the centering device 58 to serve to suppress the increase in the passing resistance accompanied by a gargling phenomenon, which may possibly occur at the time when the ascending vapor faces the descending condensed liquid. The lower end 59 of the centering device 58 is formed after a shape of dew-drop and lets the condensed liquid flow along its surface and drip down at its center without exception.

At a part of the side wall of said head part 56 in the adiabatic reservoir 50 which corresponds to a space just beneath said centering means 58, there is provided a monitoring window 62 which permits an operator to make a visual inspection of the state of said dripping as well as the amount of the condensed liquid actually placed therein. Said window may be a slit-shaped non-plated area provided on the Dewar bottle and its approximate position is indicated by broken line in the drawing.

Figure 3:
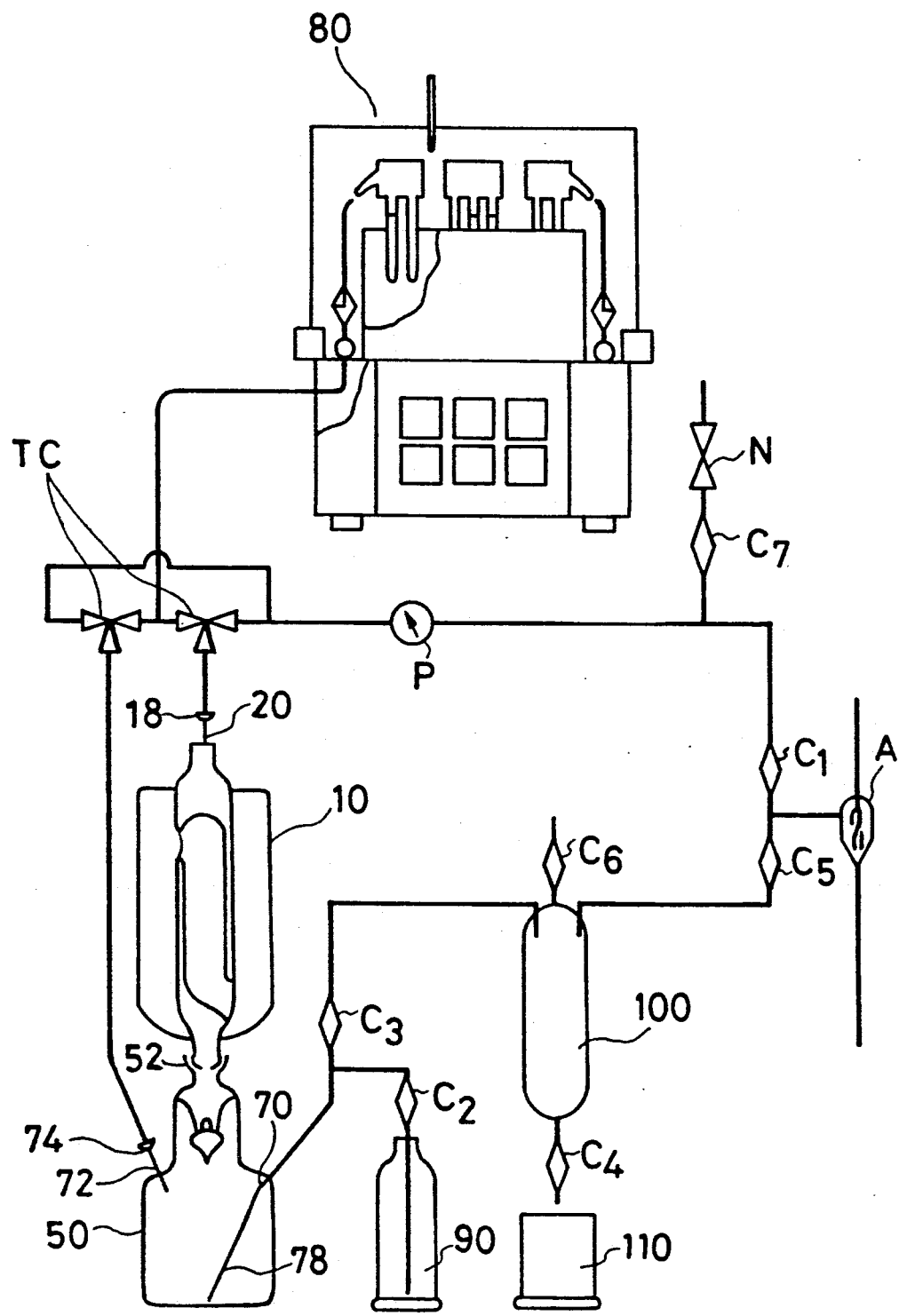
FIG. 3 is a schematic diagram of a gas/liquid separation system composed by placing these component as its essential part.

FIG. 3 is a schematic diagram of an example of a solvent concentrating system composed by combining the stated apparata as its essential components, wherein the solvent vapor from a known multiple test-tube evaporator/concentrator 80 (disclosed, for instance in Jikkaisho 62-156,344) is introduced into either one of the top part of the heat-exchanging condensor 10 through a ball-joint B1 or the shoulder of the adiabatic reservoir 50 through a ball-joint B2 depending on the state of three-way cock TC. The ball-joint which is not selected for the introduction is connected to an aspirator A through a pressure gauge P and a cock C1.

Depending on case, said three-way cock TC may be omitted. In such case, the pipeline from said evaporator/concentrator 80 can alternatively be arranged so as to switch itself to either one of said ball-joints B1 and B2, while the rest pipelines are connected to the pipeline to said aspirator A.

The guide tube 78 in said adiabatic resorvoir for condensed liquid 50 is arranged to be connected to either one of a freeze-protected solvent container 90 or a recovered solvent container 100. In an operation for recovering a solvent liable to freeze, the internal pressure of said adiabatic reservoir for condensed liquid 50 is maintained negative and some freeze-protecting solvent is introduced into the reservoir by a temporary communicating state of said cock C2. If said cock C3 is opened maintaining the pressure inside said recovered solvent container 100 lower than that inside said reservoir for condensed liquid 50, the solvent kept in said resorvoir for condensed liquid 50 can be transferred to said recovered solvent container 100.

The solvent temporarily reserved in said recovered solvent container 100 is then transferred to any container 110 through a cock C4 and finally removed from this system. The top of said recovered solvent container 100 is provided with two cocks C5 and C6, one connected to atmospheric air and the other to a pipeline lead to said aspirator A. Another cock C7 and a needle valve N is provided on the pipeline between the pressure gauge P and the cock C1 in order to adjust the pressure of the whole system.

It is needless to say that said aspirator A may be replaced by, for example, any vacuum-generating means such as vacuum pump.

Figure 4:
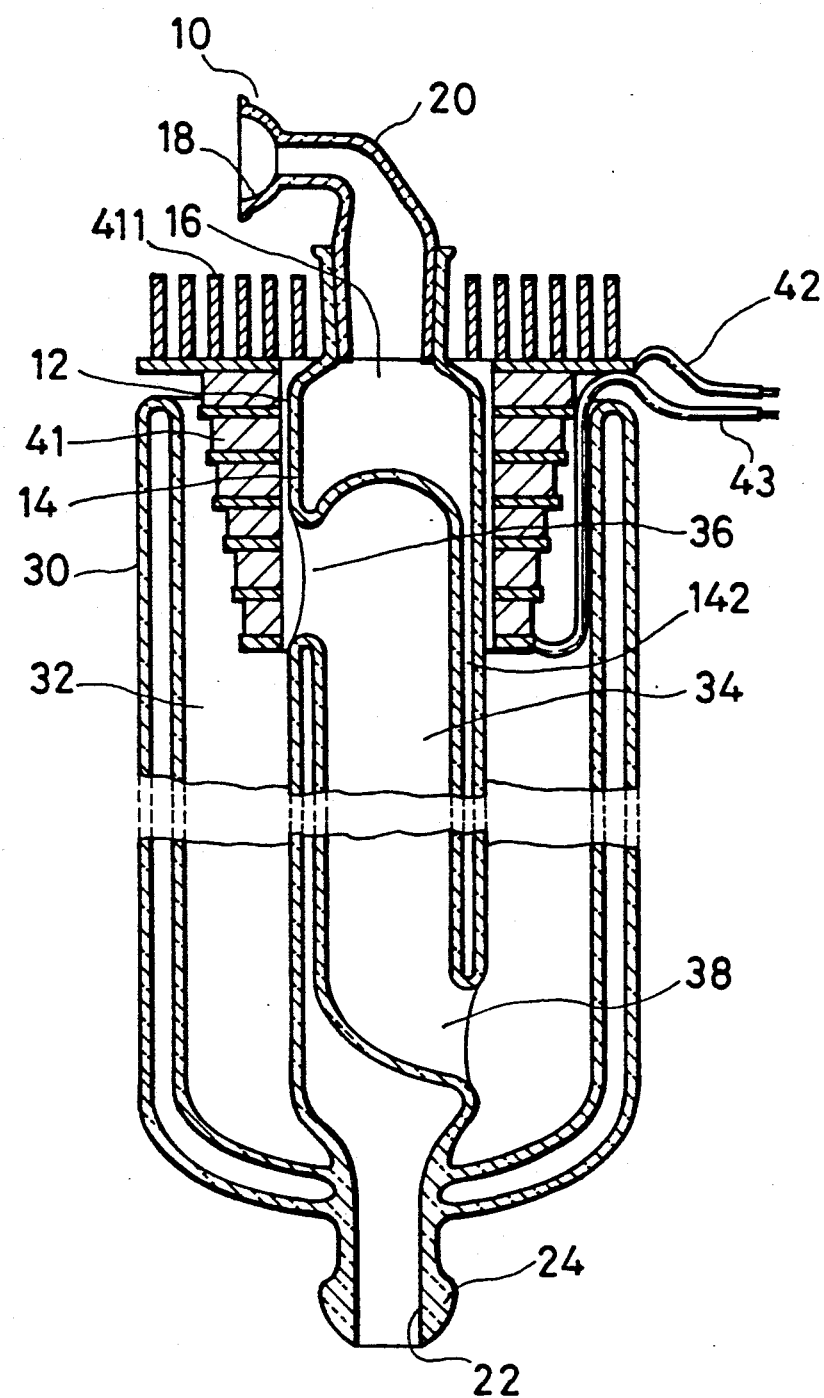
FIGS. 4 and 5 are schematic cross-sectional views of another embodiments of the heat-exchanging condensor.

FIG. 4 shows another embodiment of the heat-exchanging condensor 10 which includes a Peltier effect thermoelement 41 of laminated type as its cooling device. By supplying electric current from a power source omitted from the drawing through wires 42, 43, said element 41 shaped as doughnut can at cool at least upper portion of the coolant contained in said annular cylindrical space 32 to expect a similar effect as attained by the embodiment of FIG. 1.

Figure 5:
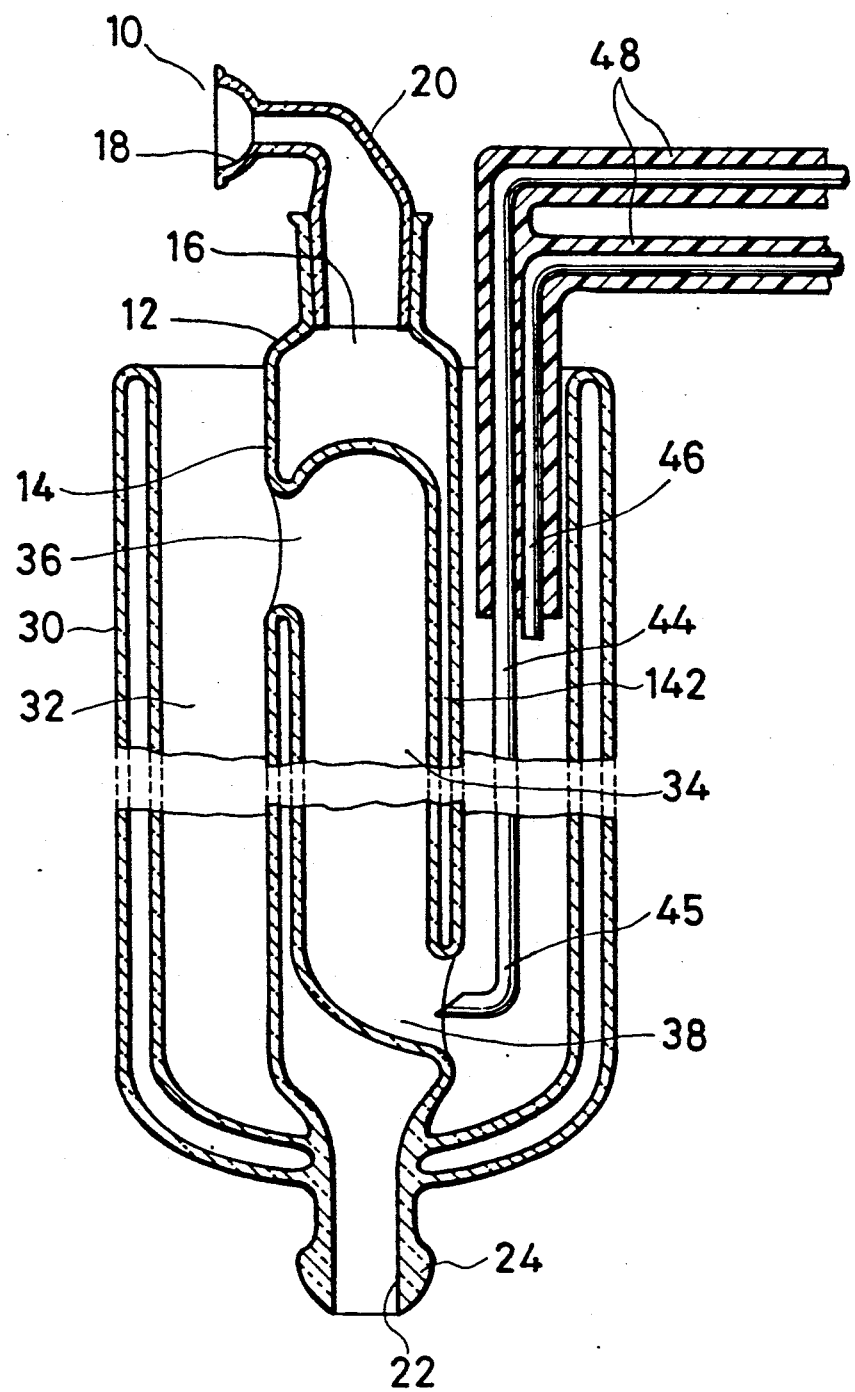
Figure 6:
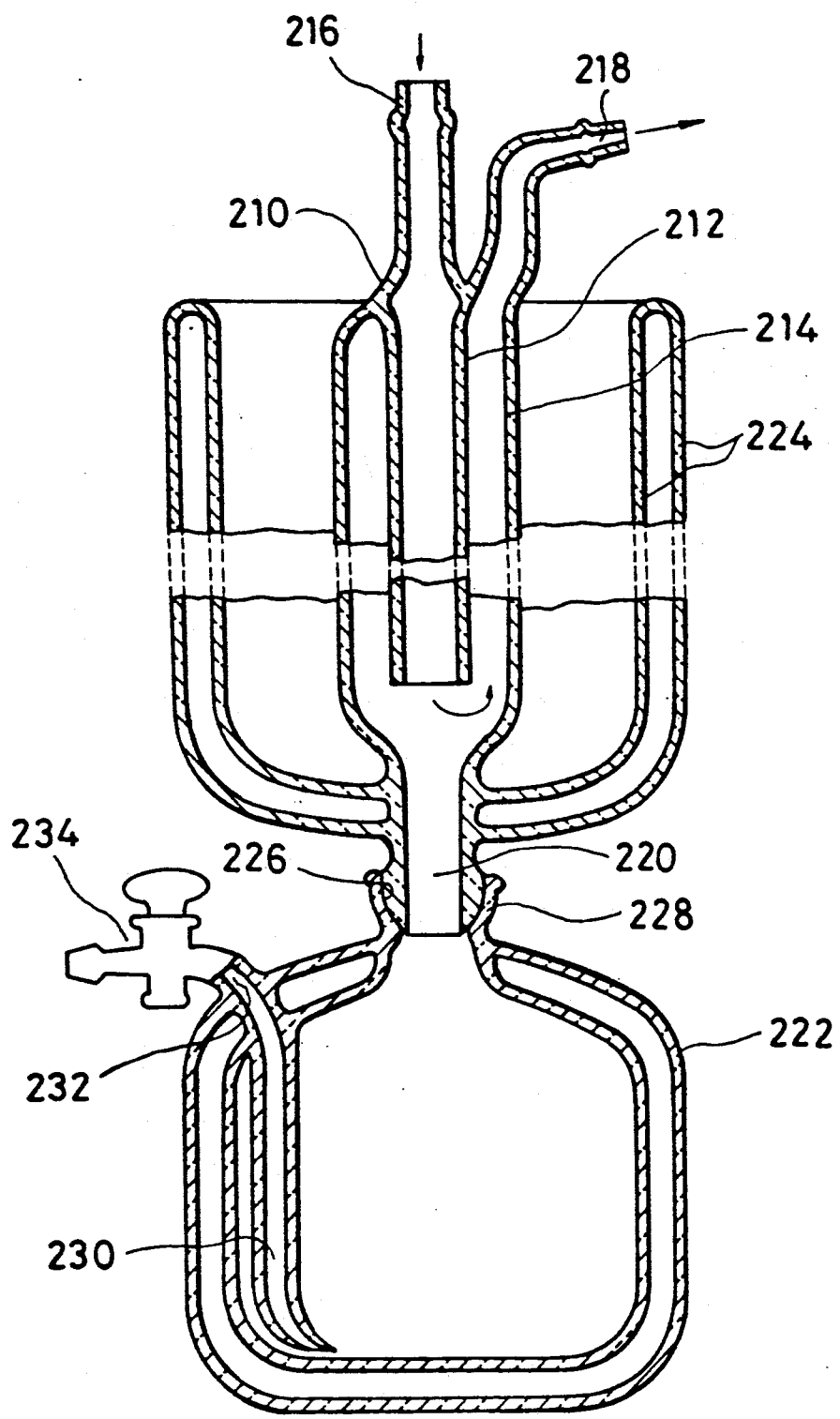
FIGS. 6, 7, 8 and 9 are schematic cross-sectional views of the apparata for gas/liquid separation of the aforementioned prior arts or their components.
Figure 7:
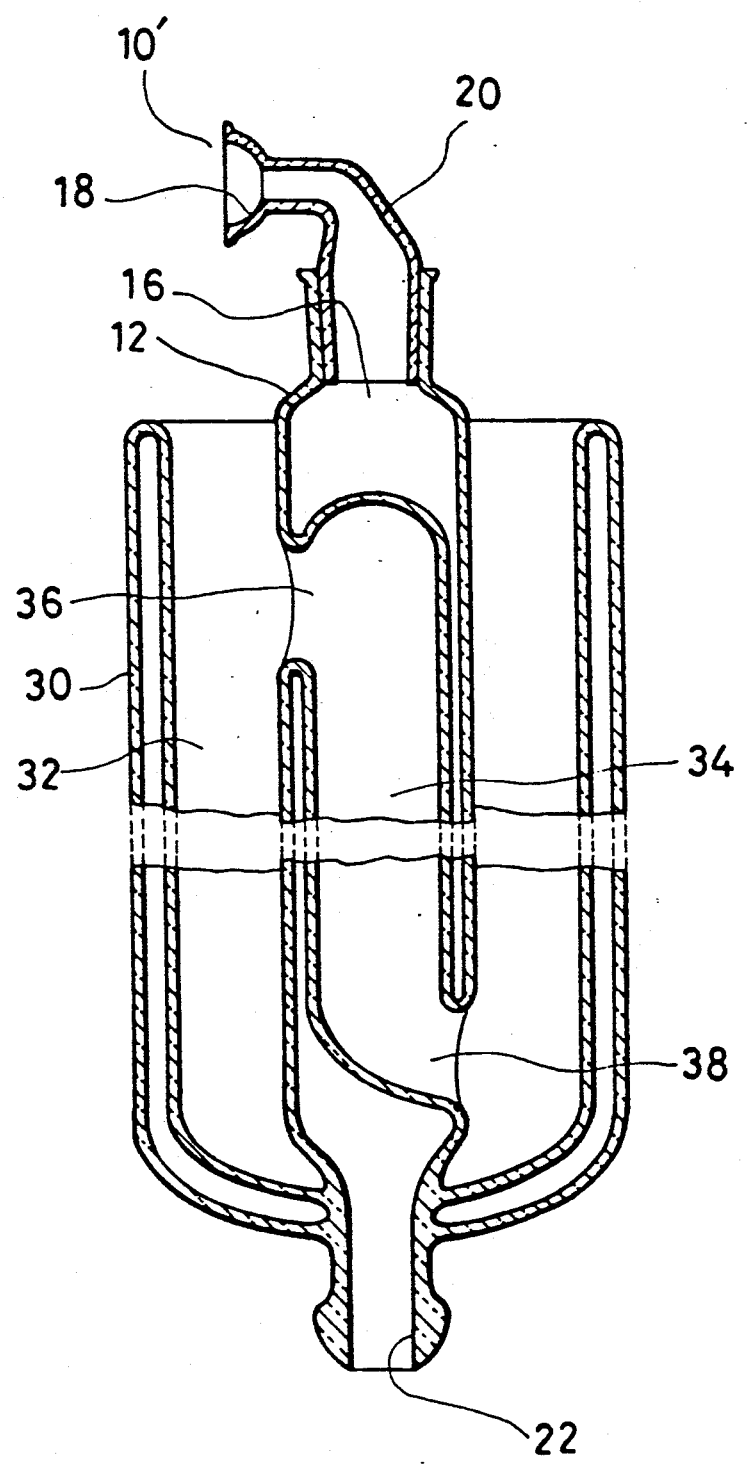
Figure 8:
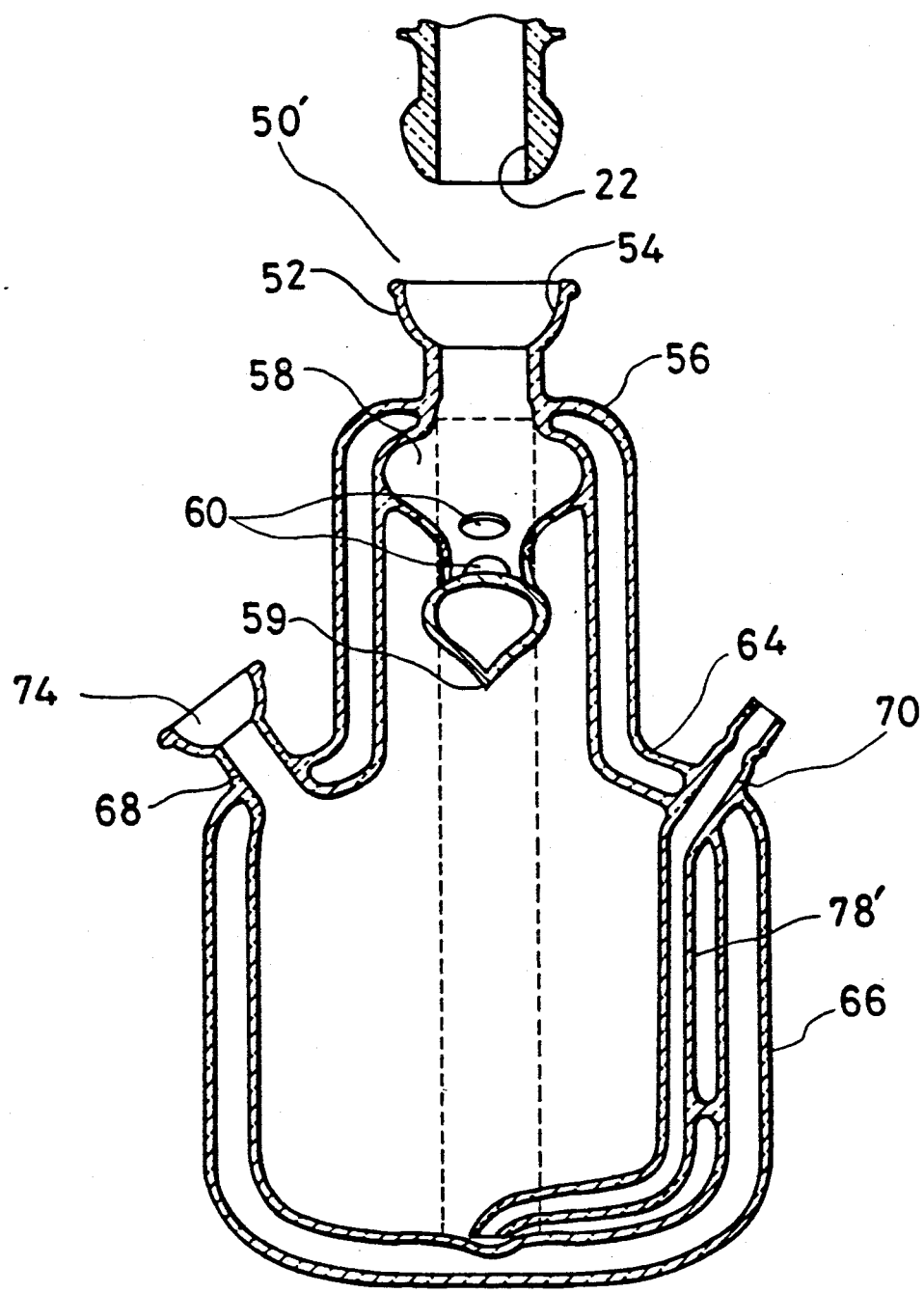
Figure 9:
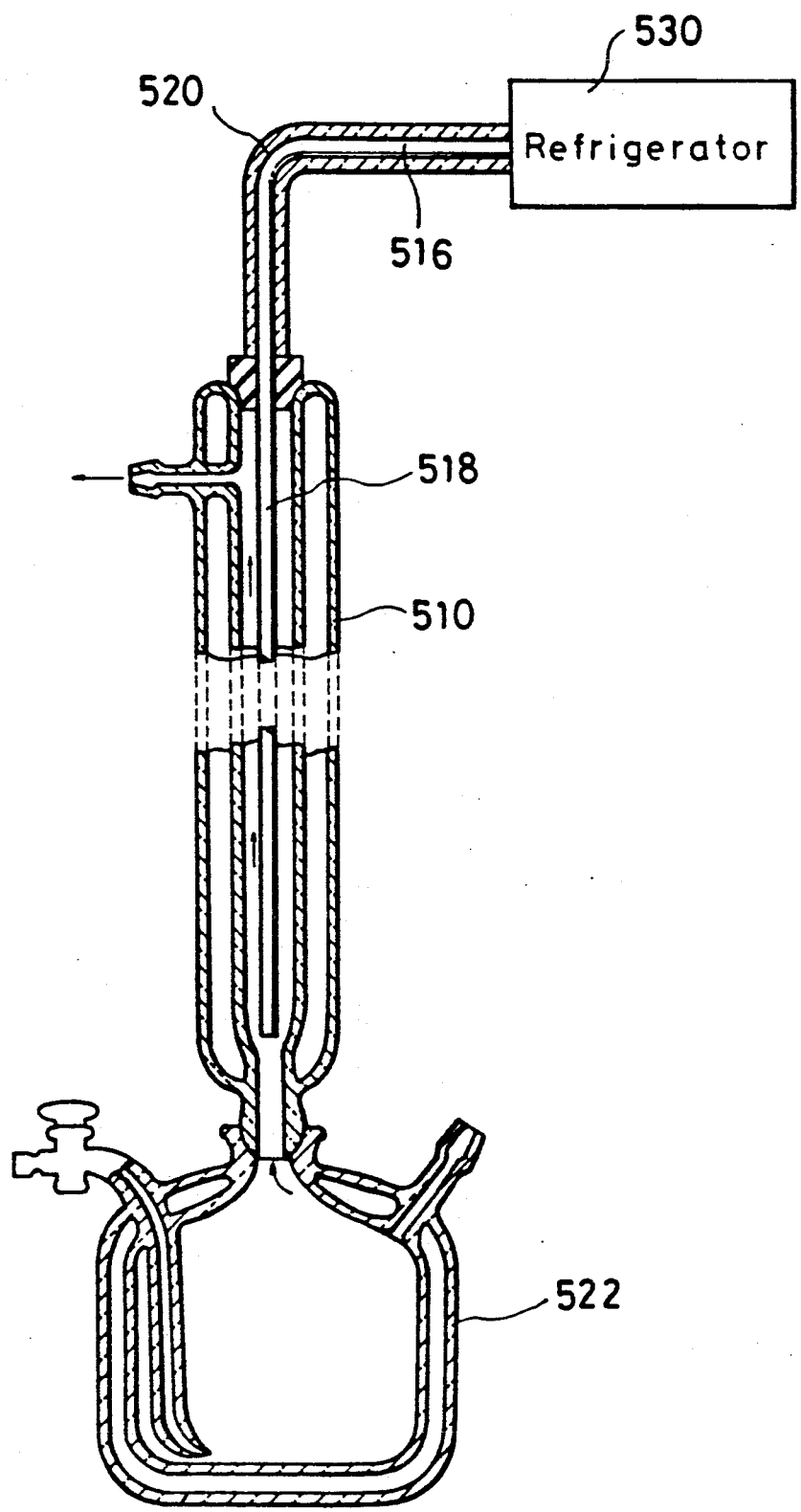

Alternatively, the coolant contained in said annular cylindrical space 32 can be cooled by an outside refrigerator and is circulated through the heat-exchanging condensor 10. In this case, the coolant to be circulated is regarded as a secondary coolant or a kind of brine if viewed from the refrigerator. An example of such an arrangement is shown in FIG. 5, wherein the coolant from the outside refrigerator omitted from the illustration is supplied to said annular cylindrical space 32 through a pipeline 44, and that the coolant in said space 32 is returned to the refrigerator through a pipeline 46. Both the pipelines 44 and 46 are encased in a sheath 48 of a heat-insulating material to be protected from a possible freezing and dew formation.

Furthermore, in the illustrated example, the tip 45 of the supplying pipeline 44 is opened at the lower part of the space while facing the lower inlet 38 of the inner path 34 in order to directly pour the coolant just cooled into the inner pipe conduit 34. Thus, the coolant can be energized to forcefully ascend through the inner pipe conduit 34 in addition to the inherent ascending tendency by convection.

The table in the following page summarizes the results of a solvent recovering experiments performed by employing the solvent concentrating system arranged as shown in FIG. 3, wherein a double tube type gas/liquid separating apparatus disclosed in Jikkaisyo 62-156,302 is used as a control equipment.

The improvements in the posted solvent recovering rate are, at a first glance, seemed to be trivial. That is, the rates obtained by the apparatus of the present invention appear to differ from those obtained by the control equipment, only slightly. The differences, however, have not easily been attained but have a great significance in the conventional closed suction system. Namely, in the conventional closed suction system, the solvent mixed with the water circulating through the aspirator may gradually accumulate therein and lower the evacuating ability of the aspirator in a short time period.

In contrast to this, according to the present invention, it is recognized that the temperatures of the recovered solvents are lowered remarkably and this fact means a great improvement in the concentrating efficiency in the previous step employing, for instance, a test-tube concentrating equipment.

As mentioned above, the present invention can be implemented in extremely diversified ways and its advantages are great. It is clear that the above description has been given by way of non limiting example. Variations and modifications are possible without going out of the scope of the claims.

TABLE

| Run | Condensor | Solvent | Conditions for Evaporating Solvent | | | | Solvent Recovering Rate (%) | Direction of Vapor Flow | Temperature of Recovered Solvent (°C.) | Note |
|---|---|---|---|---|---|---|---|---|---|---|
| | | | Tem. of Bath (°C.) | Tem. of Hot Air (°C.) | Degree of Vacuum (mm/Hg) | Time for Evaporation (min.) | | | | |
| 1 | Invention | Diethylether | 25 | | 270 | 4 | 97.3 | Descending | −47 | |
| | Control | | 25 | | 270 | 5 | 92.4 | | +5 | |
| 2 | Invention | n-Hexane | 25 | | 38 | 4 | 98.1 | Descending | −41 | |
| | Control | | 25 | | 35 | 4 | 95.2 | | −1 | |
| 3 | Invention | Acetone | 25 | 30 | 45 | 3.5 | 98.6 | Descending | −42 | |
| | Control | | 25 | 30 | 45 | 3.5 | 96.0 | | −5 | |
| 4 | Invention | iso-Propanol | 30 | 35 | 17 | 15 | 99.3 | Ascending | +7.5 | |
| | Control | | 30 | 35 | 17 | 15 | 99.0 | | +12 | |
| 5 | Invention | Benzene | 30 | 30 | 55 | 7.5 | 94.8 | Ascending | +6.3 | n-Hexane, added |
| | Control | | 30 | 30 | 55 | 7.5 | 93.5 | | +12 | |

TABLE-continued

| Run | Condensor | Solvent | Conditions for Evaporating Solvent | | | | Solvent Recovering Rate (%) | Direction of Vapor Flow | Temperature of Recovered Solvent (°C.) | Note |
| | | | Tem. of Bath (°C.) | Tem. of Hot Air (°C.) | Degree of Vacuum (mm/Hg) | Time for Evaporation (min.) | | | | |
| --- | --- | --- | --- | --- | --- | --- | --- | --- | --- | --- |
| 6 | Invention | Water | 40 | 50 | 9 | 17 | 93.7 | Ascending | +4.6 | Ethanol, added |
| | Control | | 40 | 50 | 12 | 25 | 84.2 | | +13 | |

Treated amount: 5 ml × 24 for each runs except for the case of water wherein 2.5 ml × 24 is treated.

What is claimed is:

1. An apparatus for gas/liquid separation which comprises a heat-exchanging condensor housed in an adiabatic container for coolant with its lower end piercing through the bottom of said container, in combination with an adiabatic reservoir for the condensed liquid having a head part and a shoulder formed integrally with its body, wherein;
   a) said heat-exchanging condensor includes a vertical pipe structure compartmentalized by a cylindrical partition into an inner pipe conduit and an outer pipe conduit which is substantially concentric with said inner pipe conduit, and a freezer coil for the coolant contained in an annular cylindrical space defined by the inner side wall of said container and the outer side wall of said vertical pipe structure,
   b) said outer pipe conduit permits flow of the vapor to be condensed throughout its whole length between its top opening and bottom opening,
   c) said inner pipe conduit occupies a major portion of said vertical pipe structure in cross section, and communicates with said annular cylindrical space at its upper outlet and lower inlet which pierce through said outer pipe conduit to permit convection circulation of the coolant between said inner pipe conduit and said annular cylindrical space,.
   d) said adiabatic reservoir has a top opening capable of detachably connecting with the bottom opening of said vertical pipe structure, a visual gauge extended across its entire height for monitoring the liquid drop and amount, and, on said shoulder, at least two openings, one of which receives a communicating plug which is connected, inside the reservoir, with a flexible tube capable of reaching the inner bottom of the reservoir,
   e) said head part of said adiabatic reservoir accommodates a means for centering the condensed liquid to drip down, and
   f) said freezer coil is disposed in a manner to wind said outer side wall, avoiding said upper outlet and said lower inlet.

2. An apparatus for gas/liquid separation as claimed in claim 1 which comprises a heat-exchanging condensor wherein said vertical pipe structure is formed integrally with said adiabatic coolant container.

3. An apparatus for gas/liquid separation as claimed in claim 1 which comprises a heat-exchanging condensor wherein said outer pipe conduit permits the passage of the ascending or descending flow of the vapor and the descending flow of the condensed liquid therethrough between its top and bottom openings.

4. An apparatus for gas/liquid separation as claimed in claim 1 which comprises a heat-exchanging condensor wherein said top opening is capable of connecting with an evacuation means or a vapor generating means whereas said bottom opening permits the inflow of the vapor and the outflow of the condensed liquid.

5. An apparatus for gas/liquid separation as claimed in claim 1 which comprises a heat-exchanging condensor wherein said coolant is a passive coolant and said cooling means is installed at a position where it effectively act on at least upper portion of the contained coolant.

6. An apparatus for gas/liquid separation as claimed in claim 1 which comprises a heat-exchanging condensor wherein said cooling means accommodated in said annular cylindrical space is a heat-absorbing head (freezer coil) of a split type refrigerator.

7. An apparatus for gas/liquid separation as claimed in claim 1 wherein said adiabatic condensed liquid reservoir is connected with a vacuum generating means or a vapor generating means through one of the openings provided on its shoulder.

8. An apparatus for gas/liquid separation as claimed in claim 1 wherein said centering means for the condensed liquid is a funnel shape suited for centering and dripping down of the condensed liquid at its lower end and has, on its side wall, vents for escaping vapor.

9. An apparatus for gas/liquid separation as claimed in claim 1 wherein said window for monitoring is a transparent slit formed by removing a part of the plated silver layer of the Dewar bottle.

* * * * *